United States Patent Office

3,717,085
Patented Feb. 20, 1973

3,717,085
INSTALLATION FOR BEAN SPROUT PRODUCTION
Taketoshi Sato, Tokyo, Japan, assignor to San Ritsu Company Limited, Tokyo, Japan
Filed Jan. 12, 1971, Ser. No. 105,845
Int. Cl. A01g *31/02*
U.S. Cl. 99—516        8 Claims

ABSTRACT OF THE DISCLOSURE

After germination and growth of a batch of beans in a station including a water spray, the sprouted beans are conveyed to a trough through which water flows. In the trough, the beans are agitated to release the sprouts from the bean shells, which float to the surface of the water. The shells are removed from the surface of the water, and the sprouts are removed from the trough to a packing station.

BACKGROUND OF THE INVENTION

The invention relates to an installation for the production of bean sprouts. At suitable temperatures and in the presence of water, air, and day-light, beans germinate and produce sprouts which develop in a matter of days. Bean sprouts are an important oriental foodstuff and whose consumption in other parts of the world is increasing.

SUMMARY OF THE INVENTION

The invention provides an installation for the separation of bean sprouts from a batch of beans after germination and growth, comprising conveying the beans to a trough through which water flows, agitating the sprouted beans to release the sprouts from the bean shells, which float to the surface of the water, removing the shells from the surface of the water, and removing the sprouts from the trough to a packing station.

The installation is suitable for automatic operation and is capable of continuous treatment of successive batches of beans.

The invention also provides an installation for the production of bean sprouts, comprising a germination and growth station including a water spray, means for conveying sprouted beans from the station to a trough, means for providing a flow of water through the trough, at least one agitator adapted to release the sprouts from the bean shells, whereby the shells float to the surface of the water, means for removing the shells from the surface of the water, and means for removing the sprouts from the trough to a packing station.

The shells may conveniently be removed from the water surface by allowing the water to overflow through at least one gap at one side of the trough, so that the shells spill through the gap with the water, for instance, into a gutter leading to a drain. The sprouts may preferably be raised from the trough, for instance, by an endless conveyor.

The invention will be described further, by way of example only, with reference to the accompanying drawings, which illustrate a preferred embodiment of the invention and in which:

DETAILED DESCRIPTION OF THE INVENTION

Figure 1:
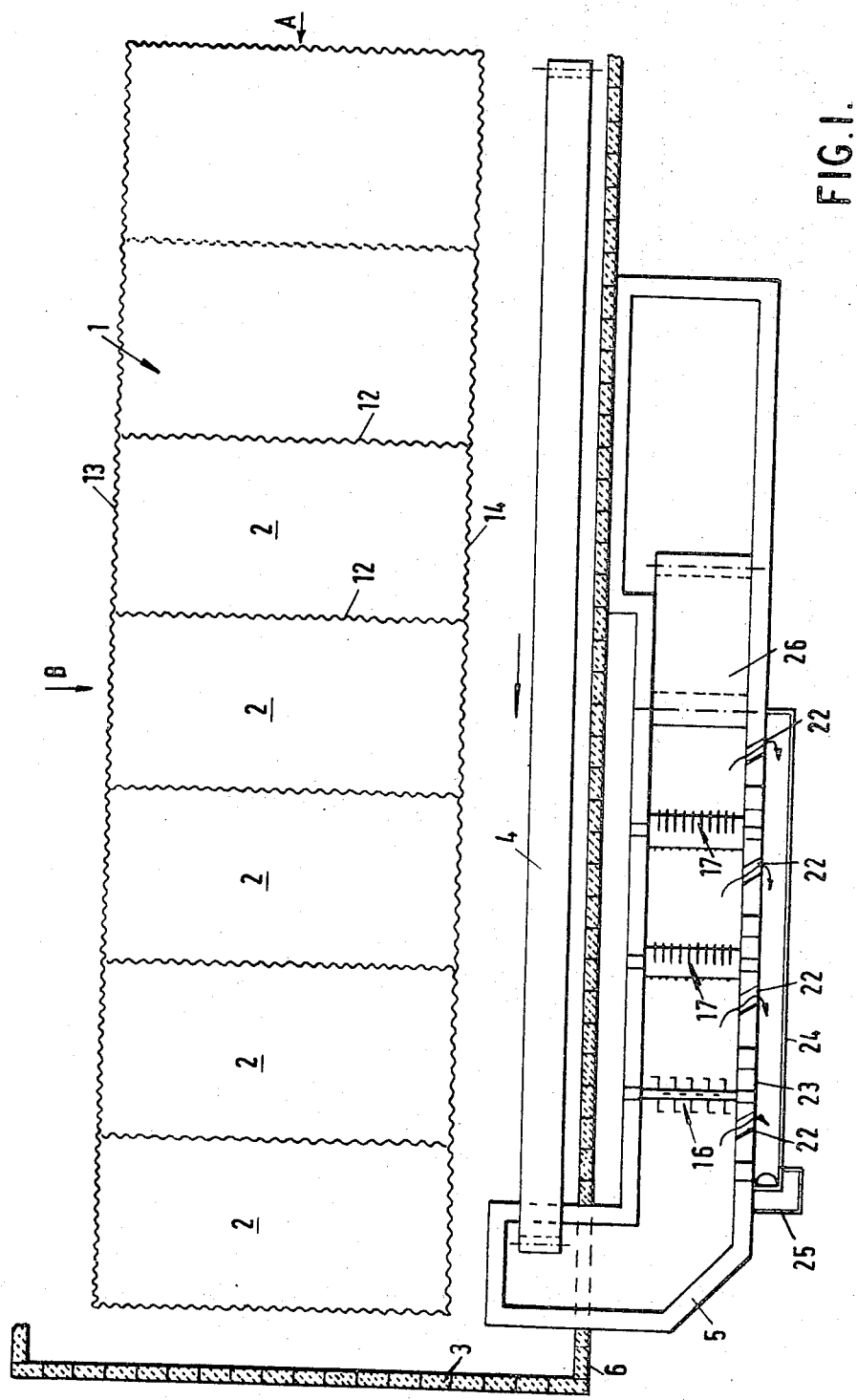
FIG. 1 is a diagrammatic plan view of part of an installation for producing bean sprouts.

The installation illustrated includes a germinating platform 1 and sprouting chambers 2 housed in a building 3. A conveyor belt 4 runs past the ends of the chambers 2 and has its discharge end arranged above a trough 5, which extends through the side wall 6 of the building 3 and runs alongside this wall. The detailed construction of the installation will be described with reference to the processing of one batch of beans.

Figure 2:
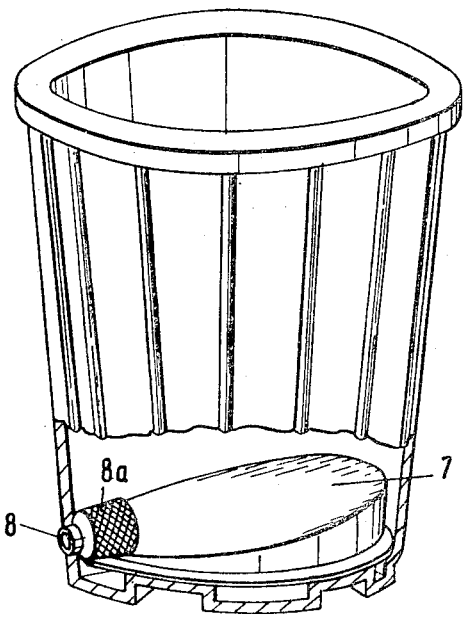
FIG. 2 is a cut-away perspective view of a bucket in which germination takes place.

About 5.4 kg. of beans are weighed into each of a number of buckets (FIG. 2) having a capacity of about 4.5 liters. Each bucket has a bottom 7 which slants towards a stoppered bung-hole 8 covered internally with netting 8a to prevent the discharge of beans. Water at about 40° C. is poured in until the bucket is about 80% full, and is stirred with a paddle; foreign material and broken beans form a scum, which is skimmed off. The beans are allowed to soak for 3-hours, and the water is then drained through the bung-hole 8.

Figure 3:
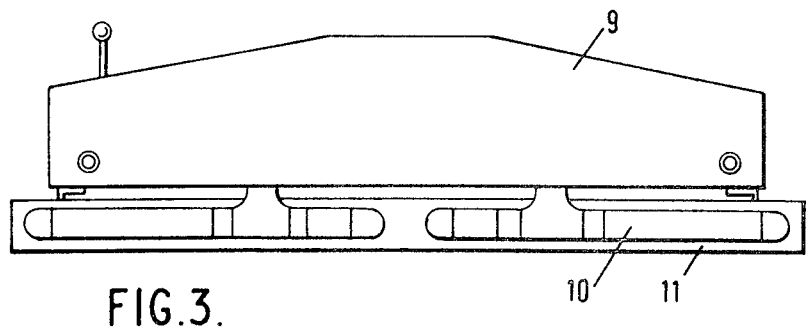
FIG. 3 is an end elevation of a mobile water shower in the installation.
Figure 4:
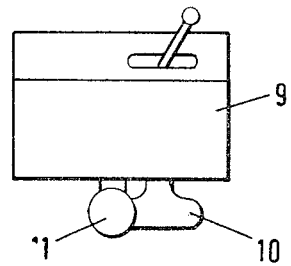
FIG. 4 is a side elevation of the mobile shower.
Figure 5:
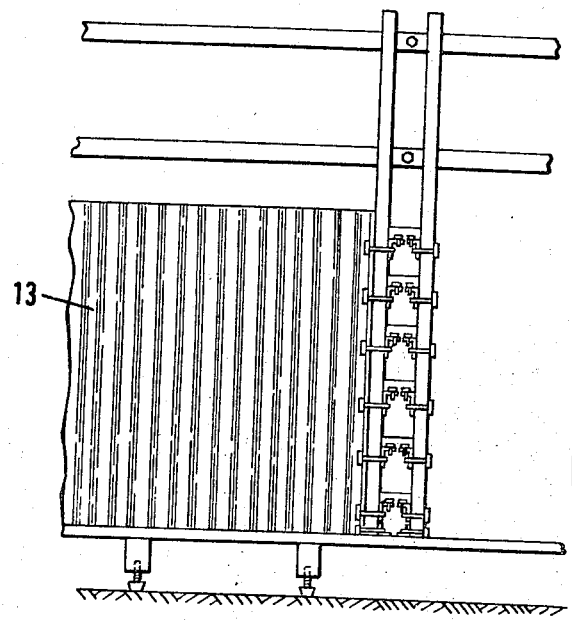
FIG. 5 is a side elevation taken in the direction of arrow B in FIG. 1.
Figure 6:
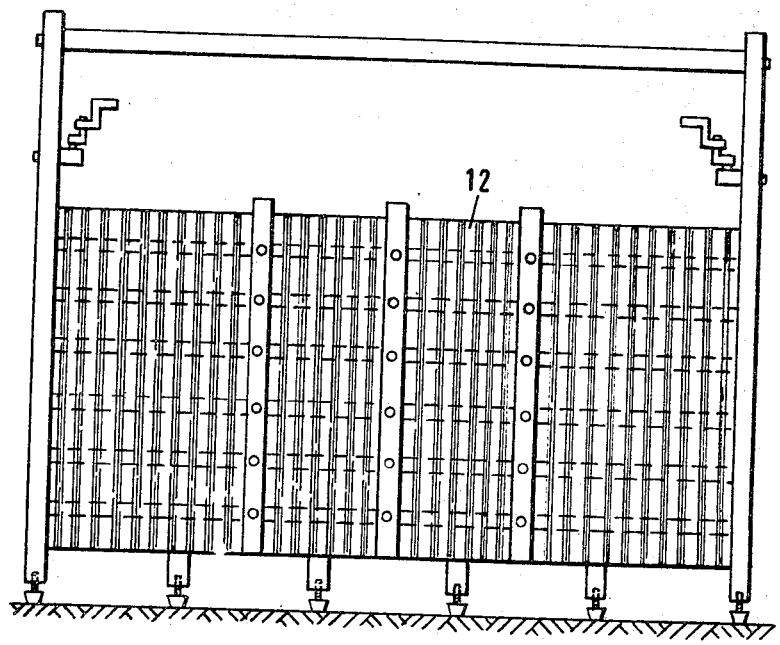
FIG. 6 is an end elevation taken in the direction of arrow A in FIG. 1.

The buckets are arranged on the platform 1. A mobile water shower 9 (FIGS. 3 and 4) is mounted on rails for movement backwards and forwards above the platform 1 and chambers 2. Water is fed to a sprinkler 11, via parallel pipes 10, from coiled flexible pipes (not shown) which are hung so as to be slidable along the roof of the building 3. About three hours after arranging the buckets on the platform 1 the mobile shower 9 is operated to spray the buckets for a short period with water at 20 to 24° C. The movement and operation of the shower 9 are controlled automatically so that the buckets are sprayed every three hours.

After about a day's soaking, the beans have germinated and are poured from the buckets into the sprouting chambers 2. Each chamber has side walls 12 and a rear wall 13, with a lower front wall 14 which is slidable in a vertical plane, each wall being of corrugated plastic material. The shower 9 moves along above the chambers 2 every three hours to spray the sprouting beans.

After about four days in the sprouting chambers 2, the sprouts reach the optimum length and size; and kilogram of beans can yield 7 to 9 kg. of sprouts. The front walls 14 of the chambers are raised and the sprouted beans are raked on to the conveyor belt 4 which carries them to the trough 5.

Figure 7:
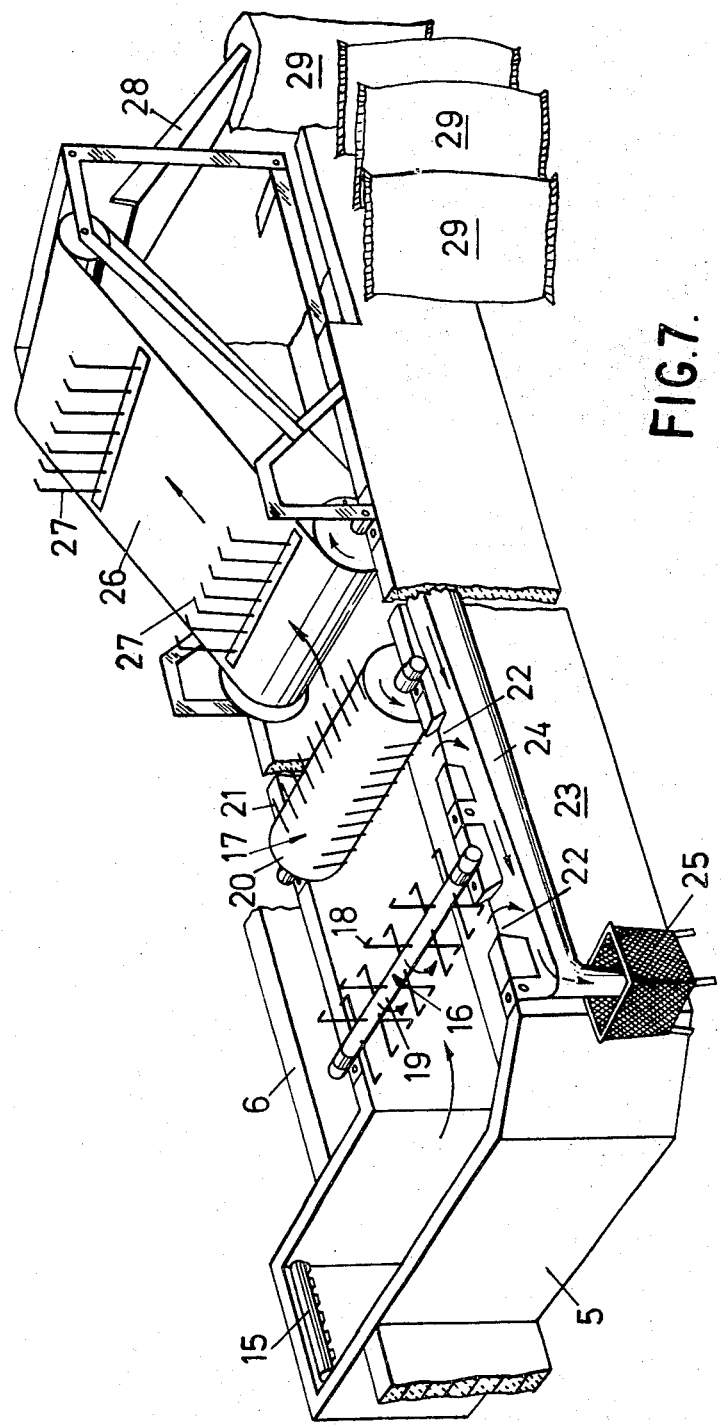
FIG. 7 is a fragmentary perspective view of part of the installation.

Water from an inlet 15 (FIG. 7) carries the beans along the trough 5 past three mechanical agitators 16, 17. The first agitator 16 comprises beaters 18 extending radially from a shaft 19 which is rotated by a belt drive (not shown) to break the bean shells and release the sprouts. The two further agitators 17 serve mainly to drive the elongated sprouts along the trough 5, by a raking action, while hindering the forward motion of the shells floating on the surface of the water; they each comprise a drum 20 driven in rotation by the belt drive and bearing approximately tangential fingers 21. The water in the trough 5 overflows through gaps 22 arranged in side wall 23 of the trough before and after each agitator 16, 17. The bean shells float to the surface of the water and are carried with the water through the gaps 22 into a channel 24 which discharges the water through a filter basket 25 into a drain.

The bean sprouts are raised from the trough 5 by a conveyor belt 26 bearing racks 27. The water drains from the sprouts as they ascend with the belt 26. This belt discharges the sprouts into a chute 28 below with polyethylene bags 29 which are successively positioned to receive the sprouts, which are then ready for shipment to market.

The above installation is capable of continuous production with only a small amount of manual labor and can yield up to two tons or more of bean sprouts per day.

I claim:

1. An installation for the production of bean sprouts comprising: a germination and growth station including a row of compartments and a water spray mounted above the compartments for motion back and forth along the row; a trough through which water flows; means for conveying sprouted beans from said station to the trough; at least one agitator in said trough to release the sprouts from the bean shells, whereby the shells float to the surface of the water; means for removing the shells from the surface of the water; and means for removing the sprouts from the trough to a packing station.

2. The installation as claimed in claim 1, in which said conveying means comprises a belt conveyor along one side of the row of chambers.

3. The installation as claimed in claim 1, including means for raking the sprouts along the trough in the direction of water flow.

4. The installation as claimed in claim 3, wherein said raking means comprise a drum mounted for rotation with its axis transverse to the trough, and a row of projecting fingers carried by the drum.

5. The installation as claimed in claim 1 in which said agitator is mechanical.

6. The installation as claimed in claim 5 in which the mechanical agitator comprises a rotatable shaft mounted transversally of the trough and substantially radial arms mounted on the rotatable shaft.

7. The installation as claimed in claim 1 in which at least one side of the trough is provided with at least one gap defining a water overflow, whereby the shells spill through the gap with the water.

8. The installation as claimed in claim 1 in which said sprout removing means comprise an endless conveyor strand extending into the trough, and racks mounted upon the conveyor strand, whereby the sprouts are raised from the trough and moved to a point of discharge.

References Cited

UNITED STATES PATENTS

| 2,522,409 | 9/1950 | Stoller | 47—14 UX |
| 2,159,619 | 5/1939 | Lisle | 134—130 |

FOREIGN PATENTS

| 1,098,581 | 3/1955 | France | 47—1.2 |

LEON G. MACHLIN, Primary Examiner

U.S. Cl. X.R.

47—1.2; 99—570; 134—130